United States Patent
Pocwiardowski (10) Patent No.: US 8,593,903 B2
(45) Date of Patent: Nov. 26, 2013

(54) CALIBRATING A MULTIBEAM SONAR APPARATUS

(75) Inventor: Pawel Pocwiardowski, Santa Barbara, CA (US)

(73) Assignee: Teledyne Reson A/S, Slangerup (DK)

( * ) Notice: Subject to any disclaimer, the term of this patent is extended or adjusted under 35 U.S.C. 154(b) by 554 days.

(21) Appl. No.: 12/734,675

(22) PCT Filed: Nov. 13, 2008

(86) PCT No.: PCT/EP2008/065443
§ 371 (c)(1),
(2), (4) Date: Mar. 21, 2011

(87) PCT Pub. No.: WO2009/062992
PCT Pub. Date: May 22, 2009

(65) Prior Publication Data
US 2011/0164467 A1    Jul. 7, 2011

Related U.S. Application Data

(60) Provisional application No. 60/996,425, filed on Nov. 16, 2007.

(30) Foreign Application Priority Data

Jan. 9, 2008    (EP) .................................... 08388001

(51) Int. Cl.
*H04B 17/00*    (2006.01)
(52) U.S. Cl.
USPC .......................................................... 367/13
(58) Field of Classification Search
USPC .......................................................... 367/13
See application file for complete search history.

(56) References Cited

U.S. PATENT DOCUMENTS

| 4,468,760 A | 8/1984 | Zalesak et al. |
|---|---|---|
| 5,381,383 A | 1/1995 | Burfeindt |
| 5,552,791 A | 9/1996 | Metal |
| 5,642,329 A | 6/1997 | Zehner |
| 5,882,307 A | 3/1999 | Wright et al. |
| 6,208,584 B1 | 3/2001 | Skinner |
| 6,577,966 B2 | 6/2003 | Balan et al. |
| 2006/0241914 A1 | 10/2006 | Barnard et al. |
| 2007/0008821 A1 | 1/2007 | Niland |
| 2011/0164467 A1 * | 7/2011 | Pocwiardowski .............. 367/13 |

FOREIGN PATENT DOCUMENTS

| EP | 1 085 306 A2 | 3/2001 |
|---|---|---|
| EP | 2063292 A1 * | 5/2009 |
| WO | WO 03/038475 A1 | 5/2003 |
| WO | WO 2009062992 A1 * | 5/2009 |

OTHER PUBLICATIONS

Pocwiardowski, "Multi-Channel Transducer Calibration System at Reson A/S Denmark", Int'l Conf. at Crete Jun. 28-Jul. 1, 2005.

(Continued)

*Primary Examiner* — Daniel Pihulic
(74) *Attorney, Agent, or Firm* — Jacobson Holman PLLC (57) ABSTRACT

A method of obtaining an acoustic echo signal by a sonar apparatus (receiver array 100, 101). The method comprises measuring phases and magnitudes of at least one predetermined acoustic calibration signal received from a plurality of respective directions 109 by the sonar apparatus; determining a complex directional response from the measured phases and magnitudes; receiving an acoustic echo signal; compensating the received acoustic echo signal for the determined complex directional response.

12 Claims, 6 Drawing Sheets

(56) References Cited

OTHER PUBLICATIONS

Chu, D., et al., "Measurement of Multibeam Sonar Directivity Patterns," Proc. of Oceans Conference, 2002 vol. 3, pp. 1411-1414.

Pocwiardowski, P., et al., "Method for Large Sonar Calibration and Backscattering Strength Estimation," Proc. of Oceans 2006, Boston, Sep. 2006.

Gaudes et al., "Robust Array Beamforming With Sidelobe Control Using Support Vector Machines", IEEE Transactions on Signal Processing, vol. 55, No. 2, Feb. 2007.

Flanagan et al, "Array self-calibration with large sensor position errors", Signal Processing 81 (2001) 2201-2214.

* cited by examiner

CALIBRATING A MULTIBEAM SONAR APPARATUS

This is a national stage of PCT/EP08/065,443 filed Nov. 13, 2008 and published in English, claiming benefit of U.S. provisional application No. 60/996,425, filed Nov. 16, 2007, which has a priority of European no. 08388001.3 filed Jan. 9, 2008, hereby incorporated by reference.

TECHNICAL FIELD

The present invention relates to the calibration of sonar signals of multibeam sonars or echo sounders, and in particular beamforming sonars.

BACKGROUND

Beamforming multibeam sonars include an acoustic array of many receiving channels. Each receiving channel includes a transducer, such as a microphone and/or hydrophone, and signal processing electronics. Signals from all channels are processed in order to obtain the desired directional response (beam) of the array. In fact by a proper signal processing it is possible to generate many beams, which will cover the region of interest. The directional response is sometimes also referred to as the beam pattern.

Different techniques for calibration of beamforming multibeam sonars have previously been described. For example, it has been proposed to calibrate the beamformed response (i.e. the overall directional response of the array when applying beamforming) of a multibeam sonar with respect to amplitude as a function of direction/angle. Such a calibration has been proposed using so-called "standard targets," i.e. standardised metal spheres having known acoustic reflection characteristics.

U.S. Pat. No. 4,468,760 describes a calibration system that can measure and display the real directional response of a hydrophone, i.e. the array output amplitude as a function of incident angle. The system can further measure and display the complex sensitivity of a hydrophone, i.e. the amplitude and phase as a function of frequency.

The article "Measurement of multibeam sonar directivity patterns", by Dezhang Chu et al. Proc. of OCEANS CONFERENCE, 2002, VOL 3, pages 1411-1414, describes a calibration experiment with a multibeam sonar system.

The article "Method for Large Sonar Calibration and Backscattering Strength Estimation" by Pawel Pocwiardowski, George Yufit, Eric Maillard, and Peter Eriksen, in Proceedings of Oceans 2006, Boston, September 2006 describes a calibration method based on a separate calibration of the acoustic and electrical components.

Another approach is disclosed in U.S. Pat. No. 5,552,791 which describes a calibration based on a laser calibration signal sent into the signal pass such that the calibration signal replaces the signal otherwise measured by the sensors during normal operation. Hence, this prior art calibration technique is concerned with the spatial distribution of the sensors and the resulting phase difference between them due to different signal path lengths within the system.

Embodiments and other aspects described herein seek to improve the suppression of sidelobes of a sonar apparatus such as a beamforming sonar by performing an improved calibration of the obtained acoustic echo signals.

SUMMARY

In particular, disclosed herein is a method of obtaining an acoustic echo signal by a sonar apparatus. Embodiments of the method comprise:

measuring one or more quantities indicative of phases and magnitudes of at least one predetermined acoustic calibration signal received from a plurality of respective directions by the sonar apparatus;

determining a complex directional response from the measured one or more quantities;

receiving an acoustic echo signal;

compensating the received acoustic echo signal for the determined complex directional response.

Hence, the method described herein provides sonar calibration by measuring and compensation of the complex directional response of a multibeam sonar based on acoustic measurements, i.e. measurements and compensation with respect to both the phase and magnitude/amplitude of the received acoustic signal as a function of the direction/angle of reception of the acoustic signal. It has been found that the calibration method described herein provides an improved calibration and, in particular, and improved suppression of undesired sidelobes.

In some embodiments, the complex directional response of the individual channels of a multibeam sonar are measured and compensated for rather than the overall beamformed response, thereby further improving the suppression of the sidelobes, since differences of the characteristics of the individual channels, e.g. mechanical or electrical differences of the transducers, are compensated.

The term "directional response" as used herein is intended to comprise a representation of the response of an acoustic receiver, e.g. an electro-acoustic transducer, as a function of the direction of propagation of the radiated or incident sound. Generally, the directional response is a representation of the response as a function of the direction of propagation in a predetermined plane through a reference centre and at a specified frequency or frequency band (see e.g. IEC CEI: Aug. 18, 2003, Revision to publication 565 and 565A, section 3.5).

The term "complex directional response" as used herein is intended to refer to a directional response comprising a complex representation of the response indicative of the magnitude and phase of the response. The term magnitude is intended to refer to any measure of magnitude e.g. amplitude, |amplitude|$^2$, etc. For example, the measured quantities may be the magnitude/amplitude and the phase directly, the in-phase and quadrature components, and/or another suitable representation of a complex signal.

Embodiments of the present invention use acoustic signals as calibration signal, i.e. sound waves received by a transducer or other device for measuring sound. While electrical measurements are easier to perform, they cover only the electrical part of the sonar apparatus, and no directional response is obtained. Acoustic measurements also cover the acoustic/mechanical part of the sonar, and it is possible to measure the complex directional response.

The acoustic measurements may be performed by measuring the response of the sonar or of the individual channels to signals received from a standard target such as a standard sphere, e.g. signals transmitted by the sonar's transmitter and reflected by a standard target at different positions relative to the sonar receiver. Alternatively, the acoustic measurements may be performed by measuring the sonar's or the individual channels' response to signals received from a standard acoustic source, e.g. a standard hydrophone, or the like. In particular cases the sphere can be replaced with a standard projector, which will transmit sound imitating the reflected signal from the sphere.

Optionally, electric measurements may be performed by replacing the receiver channel's transducers with suitable signal generators. Hence, while calibration based on electric measurements only compensate for artifacts of the receiver electronics, the acoustic measurements also allow for compensation of acoustic/mechanical artifacts of the transducers.

In some embodiments, the method comprises determining respective complex directional responses from acoustic signals received from a far field and/or a near field relative to the sonar apparatus. The near field and far field may be defined as respective ranges closer to and further away from the sonar apparatus than a predetermined threshold distance. For example, the near field may extend from 0 to e.g. 40 m depending on the sonar type. The far field may thus extend from a distance outside (or at the limit of) the near field to the end of the sonar range. The far field is also referred to as Fraunhofer zone.

Consequently, the accuracy of the obtained sonar signals in the respective ranges are further improved. This improvement is particularly interesting in the near field which is relevant for most off-shore applications.

The calibration described herein may be performed for both monostatic and bistatic configurations, i.e. configurations where the acoustic centres of the sonar transmitter and receiver coincide or are physically separated from each other, respectively.

It is noted that features of the methods described above and in the following may be implemented at least in part in software or firmware and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Embodiments of the present invention can be implemented in different ways, including the method described above and in the following, further methods, systems, devices and product means, each yielding one or more of the benefits and advantages described in connection with the first-mentioned method, and each having one or more embodiments corresponding to the embodiments described in connection with the first-mentioned method and/or as disclosed in the dependent claims.

In particular, a sonar apparatus for obtaining an acoustic echo signal comprises:
- storage means for storing calibration parameters indicative of a complex directional response determined from measured phases and magnitudes of at least one predetermined acoustic calibration signal received from a plurality of respective directions by the sonar apparatus;
- at least one receiver element for receiving an acoustic echo signal;
- a signal processor adapted to compensate the received acoustic echo signal for the determined complex directional response.

The storage means may comprise any suitable circuitry or device for storing data, such as a RAM, a ROM, an EPROM, EEPROM, flash memory, magnetic or optical storage device, and/or the like.

The calibration parameters may be stored in a variety of forms. For example, the parameters may be stored as a look-up table, e.g. a two-dimensional array, comprising a plurality of data records each associated with one of the receiver elements and with a direction of reception, e.g. parameterised as an angle of reception. Each data record may include a magnitude value and a phase value. Alternatively, for each receiver element, the magnitude and phase may be represented as respective functions interpolating or fitting a series of measured/determined calibration values as a function of the direction/angle of reception.

BRIEF DESCRIPTION OF THE DRAWINGS

The above and other aspects will be apparent and elucidated from the embodiments described in the following with reference to the drawing in which.

Throughout the drawings, equal reference signs refer to equal or corresponding elements, features, or components.

DETAILED DESCRIPTION

Figure 1:
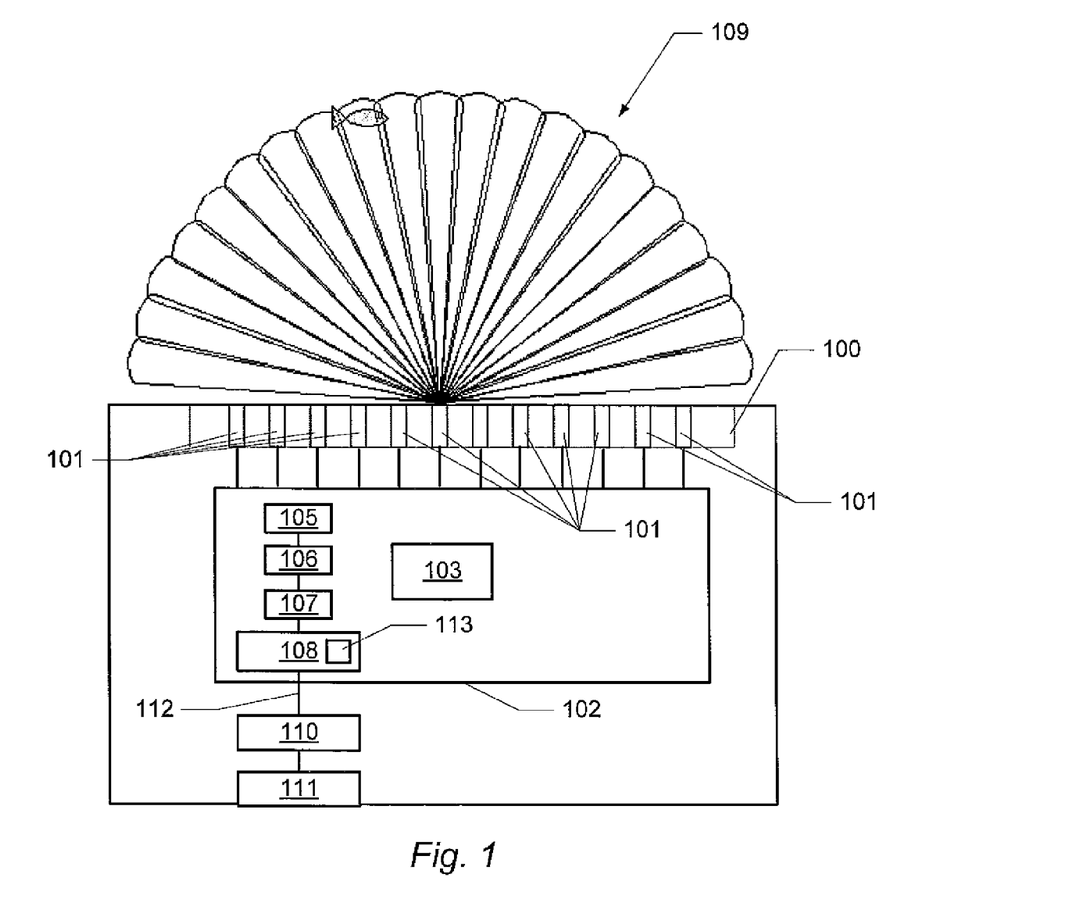
FIG. 1 shows a schematic block diagram of a multibeam sonar apparatus.

FIG. 1 shows a schematic block diagram of a multibeam sonar apparatus. Generally a sonar apparatus includes several components that may include an acoustic pulse generator, a transducer for transmitting acoustic waves, an acoustic pickup, one or more amplifiers, a delay timer, and an indicating display. Generally, a sonar apparatus emits acoustic waves and receives the sound waves that are backscattered by objects hit by the emitted sound waves. The sonar apparatus may thus determine the distances to the object by measuring the time for the echoes to return. Sonar is commonly used on board ships and other marine vessels or installations to locate underwater objects such as fish, submarines, shipwrecks, underwater installations, etc.

Accordingly, the sonar apparatus shown in FIG. 1 includes an array 100 of spaced apart receiver elements 101, such as transducers, and a signal processing unit 102 to which the receiver elements are connected. The multibeam sonar apparatus furthermore comprises a transmitter unit 103 for transmitting an acoustic signal via the transducers 101. Alternatively the sonar apparatus may comprise one or more output transducers separate from the receiver transducers 101.

The signal processing unit 102 includes circuitry and/or devices for processing the sensor signals received by the receiver elements 101. To this end, the signal processing unit 102 may comprise one or more of the following components: a multiplexer 105 for multiplexing the received signals from the different receiver elements 101, one or more pre-amplifiers 106 for amplifying the received signals, one or more analogue-to-digital (A/D) converters 107 for converting the received signal into a digital signal. Some sonar systems amplify the sensor signals and apply some type of gain control which may be automatic or time-varied (AGC or TVG), or both. Analogue pre-processing of the signal may be used to reduce the ADC sampling rates to be commensurate with the bandwidth. A common technique of sampling the sonar signals is band-pass or sub-sampling. As a result of such a processing the so-called complex envelope can be obtained which characterises the signal in terms of magnitude and phase or rather by its in-phase (I) and quadrature (Q) components. This representation will be used for the purpose of the present description.

The signal processing unit 102 may further comprise one or more of the following components: one or more calibration units 108 for compensating the received signals as described herein, a beamforming module 108 for processing the signals from the plurality of receiver elements, so as to generate a beamformed signal 112. For example, some or all of these functions may be performed by a suitably programmed FPGA. It will be appreciated that initial signal processing and calibration of the individual signals may also be performed by several signal processing circuits in parallel. Furthermore, it will be appreciated that the signal processing unit may include additional and/or alternative components.

The acoustic array 100 may contain a large number of receiving channels 101, and signals from all channels are processed in the beamforming module 108, also referred to as beamformer, in order to obtain a desired directional response of the array, also referred to as beam. In fact by a proper signal processing it is possible to generate many beams, which will cover the region of interest, as illustrated by beams 109 in FIG. 1.

The processing of the signals received from elements or channels of acoustic arrays aiming to obtain beams is also called beamforming, and several suitable beamforming techniques are known as such in the art, e.g. Fourier transformation or FFT beamformers and time-delay or true-time delay beamformers. Current beamformers can generate hundreds of beams where each beam has a beam width of e.g. 0.5 degree.

By means of formed beams, it is possible to improve the spatial resolution of the acoustic system. If one particular beam detects an obstacle, this may be reported to the operator. In this way it is possible to determine the bearing of the sound (or echo) arrival and thus the obstacle position. Furthermore, by means of the detected amount of returned echo it is possible to classify the detected obstacle. To this end the sonar apparatus may comprise a processing unit 110 that receives the beamformed signal from the signal processing unit 102, and performs one or more further signal and/or data processing steps, such as peak detection, pattern recognition, bottom classification, fish abundance estimation, object detection and classification, etc., so as to provide a suitable output to the operator via a suitable output interface 111, e.g. a display, and acoustic output, a printer, and/or the like. For example in order to classify a fish under insonication, it may be useful to qualitatively measure the returned echo in order to compare it with some reference data. Methods for obstacle detection and/or classification are well known as such in the art of sonar systems.

Since beamformers use signals received by each single element 101 or groups of staves of the array, it will be appreciated that the efficiency of the whole acoustic system depends of the performance of each element in the acoustic array.

Figure 2:
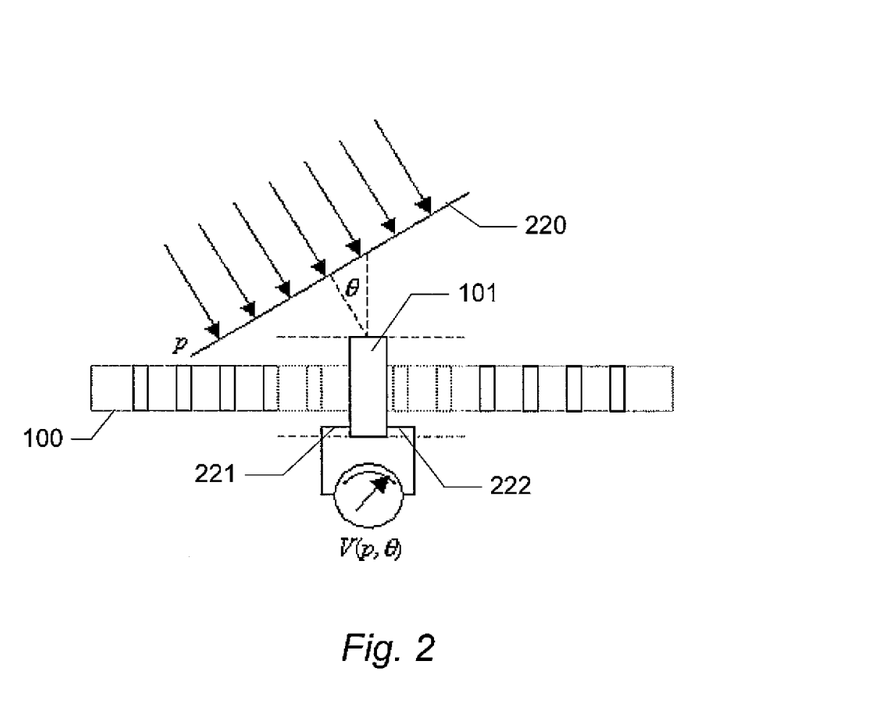
FIG. 2 schematically illustrates a receiver element of an acoustic array of a sonar apparatus.

FIG. 2 schematically illustrates a receiver element 101 of an acoustic array 100 of a sonar apparatus. In this embodiment, each element (or channel) 101 in the acoustic array is a mechano-electric transducer, which responds to the received acoustic pressure p of an incoming acoustic wave front 220 with a corresponding electric potential V generated at respective terminals 221 and 222 of the transducer.

The electric potential V or current I, generated at the transducer terminals may depend on many factors such as the accuracy of the transducer fabrication and manufacturing, the precision of mounting of the transducer in the array housing, the thickness and properties of the matching layer covering the transducer, etc. All those factors influence the characteristics of each channel in the array, which results in variations between channels in the array.

Figure 3:
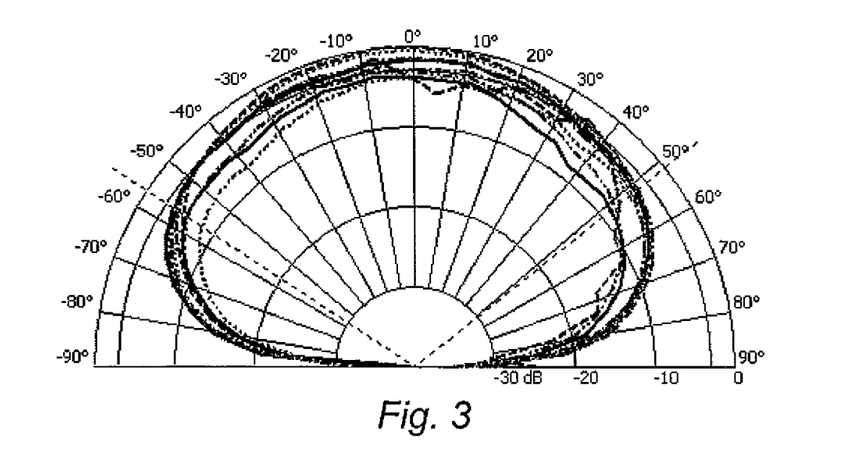
FIG. 3 illustrates the directional response for a number of channels of an acoustic array.

FIG. 3 illustrates the directional response for a number of channels of an acoustic array. As can be seen from FIG. 3, the directional response of different channels of the same array can differ in shape and in level from each other. These differences are caused by the fact that the elements of the acoustic arrays are neither ideal nor identical to each other.

Figure 4A:
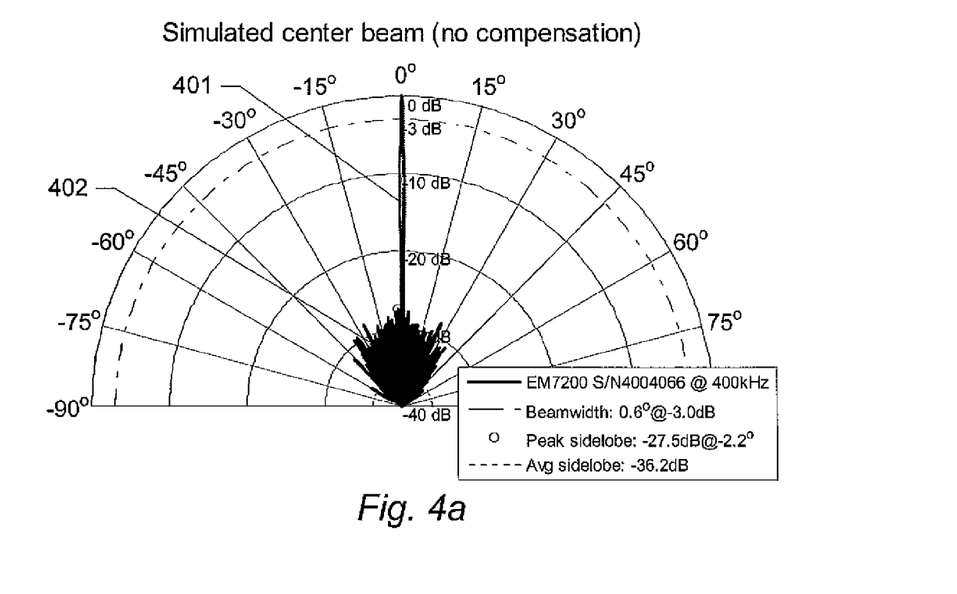
FIGS. 4 and 5 show examples of calculated directional responses corresponding to beams in different directions relative to the sonar apparatus.
Figure 4B:
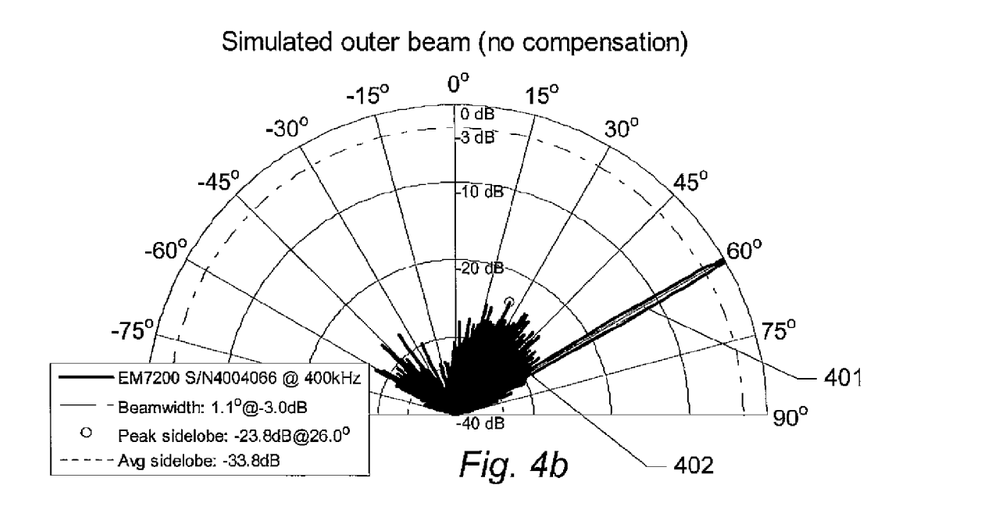

Again referring to FIGS. 1 and 2, the beamformer 108 receives signals from all the receiver elements, and calculates resulting directional responses corresponding to respective beams of the whole system from the individual signals. FIG. 4 shows examples of calculated directional responses corresponding to beams in different directions relative to the sonar apparatus. FIG. 4a shows an example of a centre beam of the sonar system calculated without compensation for variations in the beam shape and level for single elements. FIG. 4b shows an example of an outer beam of the sonar system calculated without compensation for variations in the beam shape and level for single elements. In particular, FIG. 4b shows a beamformed response corresponding to an angle of 60° relative to a centre axis of the sonar apparatus. As can be seen from FIG. 4, apart from the desired beam 401, the directional response includes a number of undesired side lobes 402. The method described herein is based on the recognition that artifacts of the beamformed response are at least in part caused by the fact that the elements of the acoustic arrays generally are not ideal and/or not identical.

As will be described in greater detail below, knowledge of the characteristics of the elementary channels of the acoustic array may be used to improve the beamforming and consequently the efficiency of the whole system. In particular, embodiments of the method described herein compensate for the measured complex directional responses of the respective elements in response to a predetermined acoustic signal source during the beamforming process so as to obtain a genuine determination of the actual acoustic signal. To this end the beamformer module 108 includes a calibration unit 113 which has measured complex directional responses of the individual receiver elements stored therein, e.g. a ROM, EPROM, flash memory or other suitable data storage device, and which compensates the phase and magnitude of the signals from the individual receiver elements during the beam forming operation and as a function of the beam angle.

Beamforming with Directional Responses:

As mentioned above, the elements of the acoustic arrays are not ideal and/or not identical. This means that the basis of the "Product Theory", widely used in array signal processing theory and practice, may lead to inaccurate results.

During the beamforming embodiments of the method described herein uses each element complex directional response to compensate for it in order to obtain the genuine determination of acoustic signal.

In a conventional beamforming process, the beamformed signal may be determined based on the following relation:

$$B(t, \theta, r) = \sum_{n=-N/2}^{N/2} s_n(t) \cdot w_n \cdot \exp(-j2\pi f \cdot \tau_n(\theta, r)) \quad \text{eq. 1}$$

Where B is the formed beam at time t and direction θ and focused at range r, $s_n$ is the element complex signal, $w_n$ is a complex weighting of the n-th element and $\tau_n$ is the time delay of the n-th element due to steering in θ direction. For the purpose of the present description, it will be assumed that the distance r is in the Fraunhofer zone of the element of the array which is satisfied in most cases.

The above equation is based on the assumption that the directional response for all elements of the acoustic array is omni-directional or at least the same. In the later case an additional term may appear before the sum according to the product theorem. However, the assumption of ideal or identical directional responses of the elements is not often met in real systems and can lead to significant errors in the estimation of the directional response of the whole array.

To account for non-ideal elements, embodiments of the method described herein take the directional response of the elements into account during the beamforming operation.

The above beamforming operation may be done for each time sample as a spatial transformation of the individual element signals weighted by corresponding complex directional responses.

$$B(t, \theta, r) = \sum_{n=-N/2}^{N/2} s_n(t) \cdot D_n(\theta) \cdot \exp(-j2\pi f \cdot \tau_n(\theta, r)) \quad \text{eq. 2}$$

Where B is the formed beam at time t and direction $\theta$ and focused at range r, $s_n$ is the element complex signal, $D_n$ is the complex directional response of the n-th element and $\tau_n$ is the time delay of the n-th element due to steering in $\theta$ direction. As above, it is assumed here that the distance r is in the Fraunhofer zone of the element of the array which is satisfied in most cases. The above equation is in general valid for arbitrary types of arrays.

As an example of the above method the simple flat array beamformer implementation, the above equation may be rewritten, since the time delays may be calculated based on the spacing between elements:

$$B(t, \theta) = \sum_{n=-N/2}^{N/2} s_n(t) \cdot D_n(\theta) \cdot \exp\left(-j2\pi f \cdot n\frac{d}{\lambda}\sin(\theta)\right) \quad \text{eq. 3}$$

In eq. 3, the spacing is assumed to be equal between all elements. It will be appreciated, however, that the method also may be applied to the case where the inter-element spacing varies. In that case, the factor d in the exponent would be replaced by a factor $d_n$ that depends on the element index n.

The elementary complex directional response $D_n$ describes the magnitude and phase response of the n-th single element used in beamforming operation. In the far field (Fraunhofer approximation) each element of an acoustic array has its own directivity function (beam pattern) $D_n(\theta)$, which is in general a complex quantity and is a function of the direction/angle $\theta$. Above, for simplicity, the directional response is expressed for a single frequency. However, it will be appreciated that the directional response may also be determined in a multi-dimensional frequency representation. Additionally, it should be noted that eq. 2 and eq. 3 may be extended to an additional coordinate ($\phi$) to fully cover 3D space.

The beam pattern and thus the elementary directional responses may be determined based on sonar signals measured as a function of target position by means of a calibrated instrument like a standard hydrophone. Another way of obtaining the elementary directional response is the use the standard sphere which during a calibration process is moved around relative to the array while all elementary responses are taken. See e.g. P., Pocwiardowski, P., K., Eriksen., "Multi-Channel Transducer Calibration System at Reson A/S Denmark", Underwater Acoustic Measurements: Technologies and Results, 28 Jun. 2005, Crete and "Method for Large Sonar Calibration and Backscattering Strength Estimation" by Pawel Pocwiardowski, George Yufit, Eric Maillard, and Peter Eriksen, OCEANS 2006, Boston, Sep. 18-21, 2006 for examples of a system suitable for measuring calibration sonar signals that may serve as an input for the calculation of complex directional responses as described herein.

Hence, in embodiments of the method described herein the complex directional responses are measured, e.g. by means of a standard sphere, and the complex directional responses are utilized in the beamforming operation, e.g. according to eq. 2.

Figure 5A:
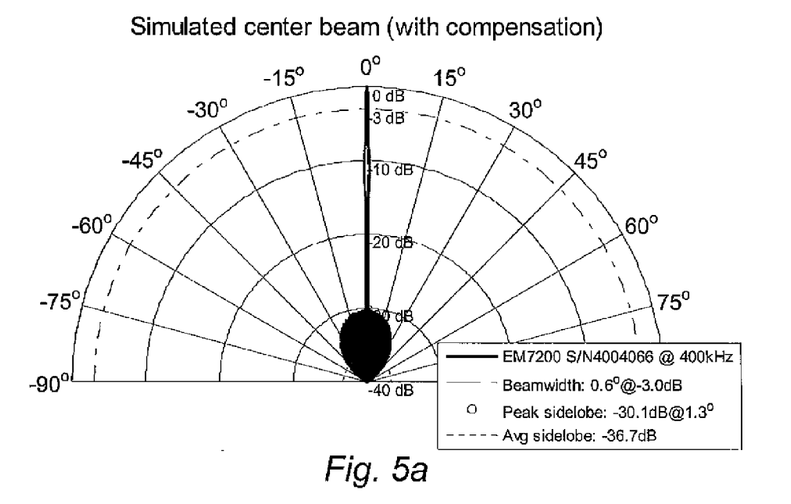
Figure 5B:
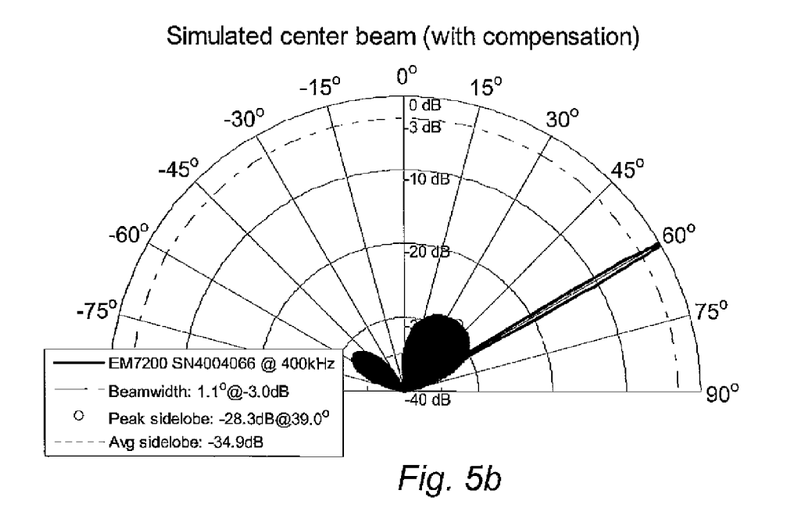

FIG. 5 shows an example of the resulting calculated beamformed responses for the same array as in FIG. 4. FIG. 5a shows the beam pattern for a centre beam, while FIG. 5b shows the beam pattern for an outer beam at 60°. In the example of FIG. 5, during the processing of the beams the single channels were taken into account and the beam patterns were compensated for the different complex responses of the individual elements as described herein. As can be seen from FIG. 5 in comparison with FIG. 4, the compensated beam pattern in FIG. 5 is smoother than the beam pattern without compensation shown in FIG. 4. The level of the sound perception is higher (resulting in a better signal to noise ratio), and the level of the sidelobes is lower (thus resulting in a smaller probability of detecting unwanted obstacles at different bearings than the beam bearing). Generally, the performance of the system increases by accounting for the single channel characteristics.

Figure 6:
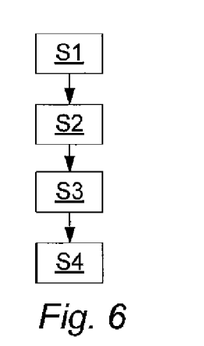
FIG. 6 shows a flow diagram of a calibration process.
Figure 7:
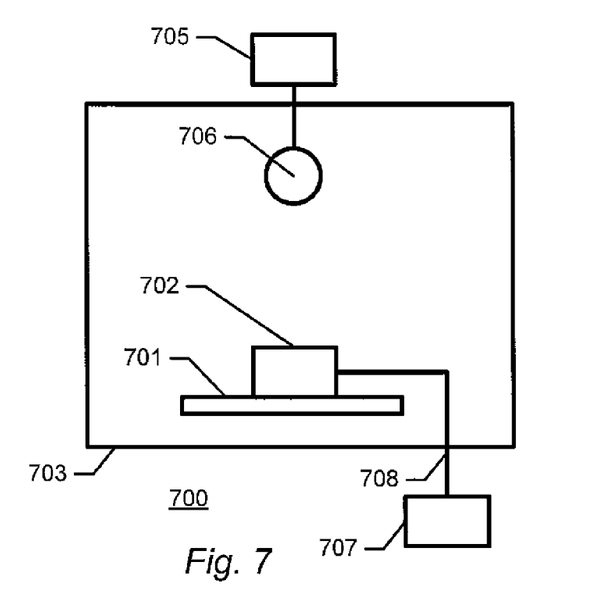
FIG. 7 schematically shows an example of a system for performing the calibration process.

An example of a calibration process will now be described with reference to FIGS. 6 and 7, where FIG. 6 shows a flow diagram of a calibration procedure for a sonar apparatus, while FIG. 7 schematically shows an example of a system for performing the calibration process.

The system, generally designated 700, comprises a mounting arrangement 701 for mounting the sonar apparatus 702, or at least the receiver array of the apparatus, at a predetermined position in a water tank 703. For example, the mounting arrangement may comprise a rotatable/turnable rack or other support structure for receiving the sonar apparatus or receiver array, e.g. a turntable, such that the rack may be suspended in water, e.g. by means of a hydraulic arm, a crane, or any other suitable device or arrangement. The system further comprises a mounting device 705 for deploying a standard sphere 706 (or a standard transducer/hydrophone) at a predetermined position relative to the sonar apparatus 702. For example, the sphere may be suspended by a crane, a hydraulic arm, or in any other suitable way. The mounting device 705 and/or the mounting arrangement 701 may be mounted on a movable frame such that the standard sphere and the sonar apparatus may be positioned at different positions relative to each other. For example the mounting device 705 and/or the arrangement 701 may be movably mounted on a frame suspended over the water tank and supported on two trolleys arranged to move along tracks or guides on respective sides of the water tank. Consequently the position of the device 705 and/or the arrangement 701 may by changed in a horizontal plane as well as in the vertical direction.

It will be appreciated that the system may allow for horizontal and or vertical movement of the standard sphere, the sonar apparatus, or both so as to provide a desired relative positioning of the standard sphere relative to the sonar apparatus.

The system further comprises a signal and data processing unit 707, e.g. a computer or other data processing device comprising suitable data acquisition circuitry, e.g. in the form of a suitable data acquisition circuit board. The signal and data processing unit is connected to the sonar apparatus via a suitable data connection 708, e.g. a serial or parallel interface, a local area network, and/or the like, for receiving the acoustic signals detected by the receiver elements of the sonar apparatus 702 and for forwarding the calibration parameters determined by the signal and data processing unit 707 during the calibration process for storage in the sonar apparatus 702. It will be appreciated that the signal and data processing unit may be implemented as a single unit or as separate modules, e.g. a signal acquisition unit and a separate data processing unit. In some embodiments some or all of the signal and/or data processing may be performed by a suitable processing unit of the sonar apparatus. It will further be appreciated that the data processing and storing of calibration parameters may be performed during the measurement process or at a later point in time, e.g. after completion of the data acquisition phase.

An example of such a system is described in more detail in P., Pocwiardowski, P., K., Eriksen., "Multi-Channel Transducer Calibration System at Reson A/Denmark", Underwater Acoustic Measurements: Technologies and Results, 28 Jun. 2005, Crete.

In initial step S1 of the data acquisition phase, the sonar apparatus 702 to be calibrated is mounted in water, e.g. a water tank 703, with a sufficiently large free field, e.g. 2 m×2 m. In step S2 a standard sphere 706 is deployed at a predetermined distance from the sonar apparatus, e.g. 1 m. The standard sphere may for example be made of copper, tungsten, steel, or another suitable material. In one example a sphere with 38.1 mm diameter was used. In step S3, the backscattered signal received by each receiver element in the acoustic array of the sonar apparatus 702 is acquired and recorded with the standard target positioned at different directions relative to the sonar apparatus. To this end, the sonar apparatus may be rotated in discrete steps, and at each orientation the sonar apparatus is controlled to transmit a sound signal and to receive the resulting reflected sound. In one example the sonar apparatus was rotated in 5 degree steps between e.g. −75 to 75 degree (bearing of the standard target relative to a centre axis of the sonar apparatus). In one example, at each step, a 150 μsec pulse was transmitted, and the corresponding received signals of all elements were recorded. The received signals of the receiver elements are recorded by the signal and data processing unit 707 in a suitable format, e.g. as a time series of In-phase and quadrature (IQ) signals. For each step, the recorded signals and the angle are recorded. The accuracy of the calibration is improved when the angle at each step is recorded accurately, e.g. with an angle encoder at e.g. 0.1 degree accuracy.

Once the data is acquired, the magnitude and phase for each element is determined by the signal and data processing unit 707 in the subsequent data processing step S4. In particular, for each data set in any measured angle, a calibration procedure is applied which returns the magnitude and phase for each element at the specified rotation.

Figure 8:
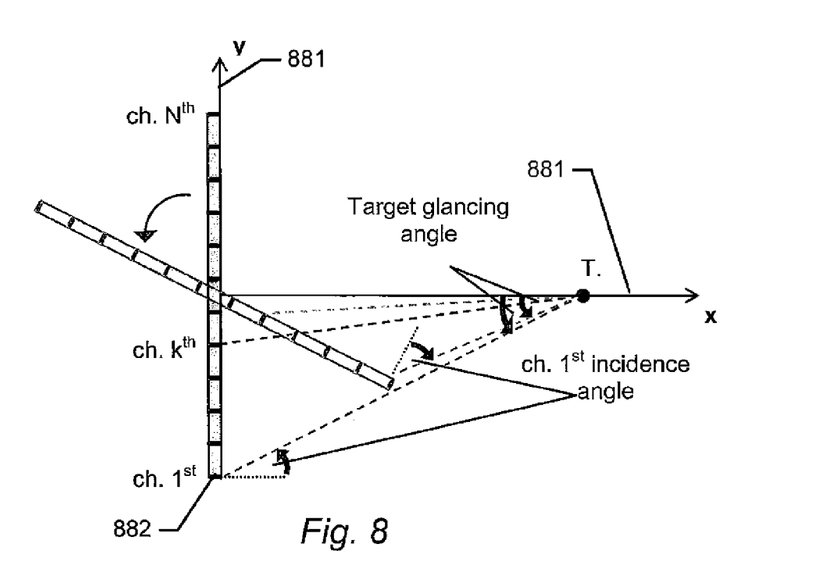
FIG. 8 illustrates an example of the determination of the position of the target relative to the sonar array.

In a two dimensional space (e.g. in a plane of reference of the sonar array denoted here as the XY plane) the process can be performed as follows: For each rotation angle the target coordinates and all channel coordinates have are calculated. Additionally the incident angle towards the target of each receiving element is calculated, as illustrated in FIG. 8. For example, if the target T is located at position $P_T=(X_T,Y_T)$ in a rectangular coordinate system (881) and the 1-st array element (882) is located at $C_1=(X1, Y1)$, than the range to the target and incident angle for this channel at this rotation may be expressed as:

$$\vec{r}_1 = \vec{P}_T - \vec{C}_1 = (r_{1x}, r_{1y}) = (P_{Tx} - C_{1x}, P_{Ty} - C_{1y}) \qquad \text{eq. 4}$$

$$\theta_1 = a\tan\left(\frac{r_{1x}}{r_{1y}}\right) = a\tan\left(\frac{P_{Tx} - C_{1x}}{P_{Ty} - C_{1y}}\right)$$

In the similar fashion all incident angles for all channels for each rotation are calculated.

For every rotation step the signal received by each of the N array elements consists of an IQ pairs waveform and here is called $s_n(t)$. The process of obtaining a complex IQ waveform is well-known in the art of signal processing. Nevertheless, the basic concept of it can briefly be explained as follows and with reference to FIG. 9:

For the purpose of explaining the receipt and representation an IQ waveform, we assume a received band-limited signal X(t) that can be a random process of two-sided power spectra density given by:

$$S_{xx}(\omega) = \begin{cases} |\omega - \omega_0| \geq \pi\varpi \\ |\omega + \omega_0| \geq \pi\varpi \end{cases} \qquad \text{eq. 5}$$

Figures 9A, 9B, 9C, 9D:
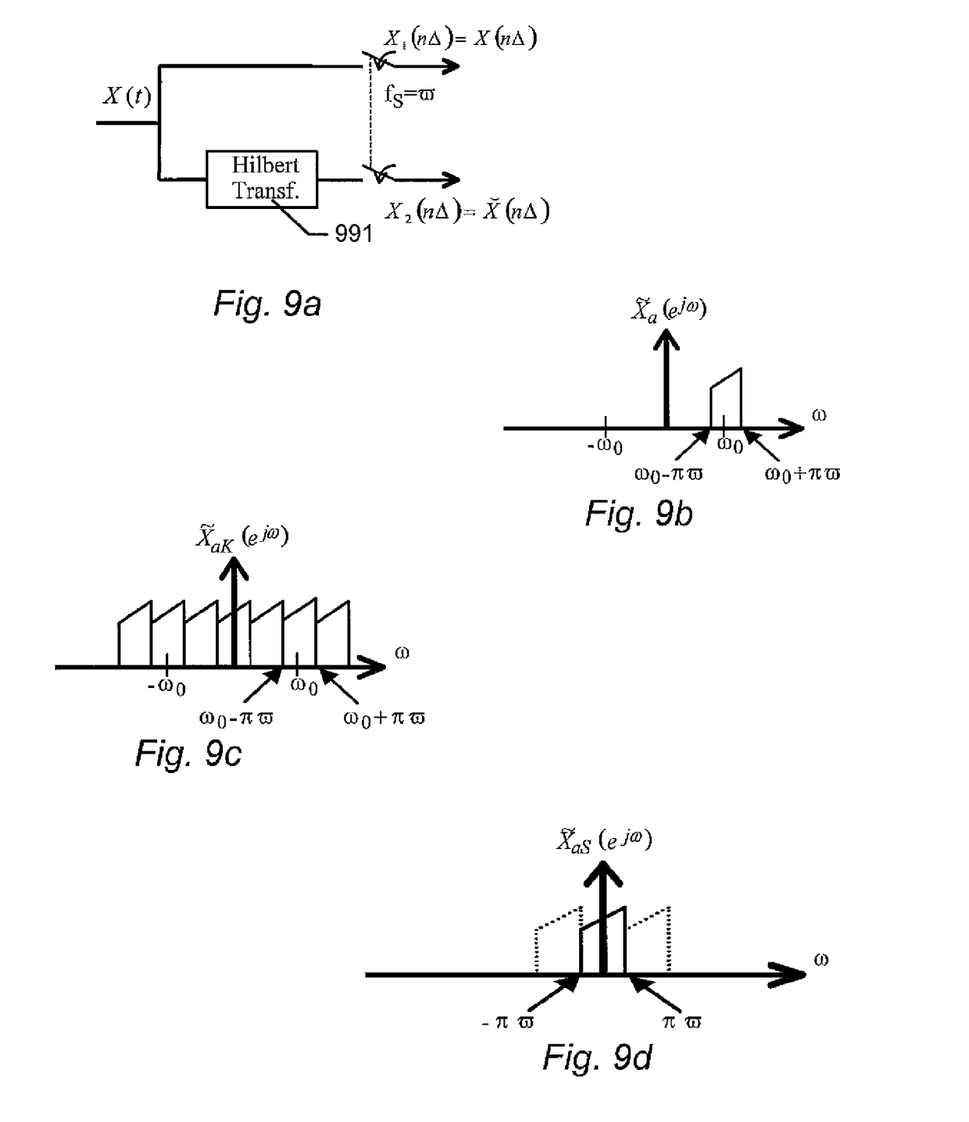
FIG. 9 illustrates an example of the acquisition of the sampled calibration signal.

FIG. 9a shows a schematic block diagram of a circuit for performing a Hilbert transformation of the received signal X(t). The circuit includes an analog Hilbert transformer 991 and results in an analytical signal. An example of the spectrum of the analytical signal is schematically shown in FIG. 9b. The analytical signal has the special features that its negative frequency spectrum is zero, and that the positive spectrum has the same bandwidth as it has had before the transformation, i.e. $\overline{\omega}$.

The circuit schematically shown in FIG. 9a this results in an output signal as follows:

$$\tilde{X}_a(t)|_{t=n\Delta} = [X(t) + \check{X}(t)]_{t=n\Delta} = X(n\Delta) + \check{X}(n\Delta) \qquad \text{eq. 6}$$

The signal consists of two signals, the original signal and his Hilbert transformation $$\check{X}(t) = \text{Hilbert}\{X(t)\}.$$

This signal may now be sampled by means of a suitable A/D converter at the low rate of $f_S = \overline{\omega}$. So the ideal sampling at this rate is a signal $\tilde{X}_{aK}(t)$, which consists of the series of delta functions as follows:

$$\tilde{X}_{aK}(t) = \tilde{X}_a(t) \sum_{n=-\infty}^{n=\infty} \delta(t - n\Delta) = \sum_{n=-\infty}^{n=\infty} \tilde{X}_a(n\Delta)\delta(t - n\Delta) \qquad \text{eq. 7}$$

where $\Delta$ is the sampling time equal to $\Delta = 1/\overline{\omega}$. The spectrum of the sampled analytical signal is shown in FIG. 9c and is derived as:

$$\tilde{X}_{aK}(e^{j\omega}) = \qquad \text{eq. 8}$$

$$\tilde{X}_a(e^{j\omega}) * F\left\{\sum_{n=-\infty}^{n=\infty} \delta(t - n\Delta)\right\} / 2\pi = \frac{1}{\overline{\omega}} \sum_{n=-\infty}^{n=\infty} \tilde{X}_a(e^{j(\omega - n2\pi\overline{\omega})})$$

When the assumption that $f_0/\overline{\omega}$=integer is satisfied than one can obtain baseband replica as indicated in FIG. 9d. Otherwise it may be necessary to apply the noiseless heterodyne to move the signal near to the frequency $\omega=0$. This can be accomplished by simply multiplying the desired signal by the $\exp(-j\omega n\Delta)$, where $\omega/2\pi = f_0 - n \cdot \overline{\omega}$ and n is the largest integer $\leq f_0/\overline{\omega}$.

The complex signal resulting from the acquisition process for each element n may thus be represented in the Cartesian coordinates as $s_n = I_n + jQ_n$, where j is an imaginary unit. It can be also represented in the polar coordinates as $$s_n = \sqrt{I_n^2 + Q_n^2} \exp\left(j \cdot a\tan\left(\frac{Q_n}{I_n}\right)\right) \quad \text{eq. 9}$$

The first term $\sqrt{I_n^2 + Q_n^2}$ refers to the magnitude of the signal and the second term $a\tan(Q_n/I_n)$ refers to the phase of the signal $s_n$.

With such a defined system, each rotation will result in N time-waveforms of the complex envelope signals $s_n$.

This signal is then used to obtain the magnitude and phase for each element of the array in a particular direction by selecting the sample which corresponds to the location of the target.

If the signal $s_n$ contains the time-waveform of the reflected signal from the target, then the time delay of receipt of the reflected signal (relative to the emission of the signal) is $$\tau_n(\theta, r) = 2\frac{|r_n|}{c} \quad \text{eq. 10}$$

where r is the previously calculated vector between element and the target and c is the speed of sound in the water. It shall be noted that if the target is replaced by the standard projector, the time will be half of the one presented above due to one-way travel (the multiplication by two will disappear).

With the $\tau_n$ calculated the signal s will undergo the time delay as:

$$ss_n(t,\theta,r) = s_n(t) \cdot \exp(-j2\pi f \cdot \tau_n(\theta,r)) \quad \text{eq. 11}$$

In this case by picking the sample corresponding to time $\tau_n$, which is $k=\tau_s$, the single complex number $ss_n(k) = \text{abs}(ss_n(k)) + \exp(j \arg(ss_n(k)))$ represents the magnitude and phase of the element n in the direction $\theta$.

Further, for the purpose of the present description, we define the Complex Directional Response of the element n of the array $D_n$ as:

$$D_n(\theta) = \frac{1}{ss_n(k, \theta)} \quad \text{eq. 12}$$

By computing the complex $ss_n$ for each direction we obtain the $D_n$ for each channel, which is the vector of complex numbers corresponding to each measured direction. This variable may this be used to compensate a subsequently acquired incoming signal according to the eq. 2.

Hence, as a result of the complete calibration procedure, each element of the receiver array has its complex directional response characterized. The calculated phases and magnitudes may then be stored in the sonar apparatus for use in the compensation of subsequently measured signals. Due to heavy numerical load these values may be stored in the memory 113 of the calibration unit 113, e.g. of a FPGA device, as a 1D complex vector for each element, and they may be used in the real-time processing of received signals so as to compensate the incoming signal for the directional magnitude and phase of each individual channel of the array.

During the beamforming operation the incident angle may be arbitrary and not necessary corresponding to the angles measured during the calibration period. Due to that, the magnitude and phase is interpolated between two neighbourhood points to find the corresponding response in the desired direction. Normally the linear interpolation will be enough to get a proper magnitude and phase response.

The equation 2 above may be used directly to beamform the signal, but very often approximations to the time delay $\tau_n$ are used to increase the throughput of the processing unit. There are many approximation methods known in the art.

In some embodiments, the above calibration procedure may be repeated with the standard target positioned at different distances from the sonar apparatus, thereby allowing separate calibrations for the near field and the far field, respectively.

Hence, in the above a method for providing a complex directivity calibration is disclosed that may be used for an improved calibration of e.g. multibeam sonars.

Although some embodiments have been described and shown in detail, the invention is not restricted to them, but may also be embodied in other ways within the scope of the subject matter defined in the following claims.

Embodiments of the method described herein can be implemented by means of hardware comprising several distinct elements, and/or at least in part by means of a suitably programmed microprocessor.

In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of obtaining an acoustic echo signal by a sonar apparatus comprising an acoustic array of receiver elements for receiving acoustic signals; and wherein the method comprises:
    measuring one or more quantities indicative of phases and magnitudes of at least one predetermined acoustic calibration signal received from a plurality of respective directions by each of the receiver elements;
    determining respective complex directional responses for each of the receiver elements from the measured one or more quantities;
    receiving an acoustic echo signal by each of the receiver elements;
    compensating the received acoustic echo signal for the determined complex directional response for each of the receiver elements.

2. A method according to claim 1, wherein determining respective complex directional responses comprises determining a vector of complex responses, each corresponding to one of a set of predetermined directions.

3. A method according to claim 1, wherein compensating comprises calculating a transformation of the received acoustic echo signals weighted by the corresponding determined complex directional responses.

4. A method according to claim 1, further comprising generating the acoustic calibration signal as a reflected acoustic signal from a predetermined object positioned at respective positions relative to the sonar apparatus.

5. A method according to claim 4, wherein the object is a sphere of predetermined size and predetermined material.

6. A method according to claim 1, comprising determining respective complex directional responses from acoustic signals received from a farfield and a nearfiled.

7. A method according to claim 1, wherein the sonar apparatus is a beamforming sonar apparatus.

8. A method according to claim 1, wherein measuring comprises measuring one or more quantities indicative of the phases and magnitudes of the at least one predetermined acoustic calibration signal received from a plurality of respective directions, wherein the respective directions are defined by respective angles in a predetermined reference plane.

9. A method according to claim 1, comprising storing calculated phases and magnitudes in the sonar apparatus for use in the compensation of subsequently measured signals, and using the stored calculated phases and magnitudes in a real-time processing of received signals.

10. A method according to claim 1, wherein the complex directional response comprises a representation of the complex response of an acoustic receiver as a function of the direction of propagation of the acoustic calibration signal, wherein the complex response is indicative of the magnitude and phase of the response of the acoustic receiver.

11. A sonar apparatus for obtaining an acoustic echo signal, the sonar apparatus comprising:
   an acoustic array of receiver elements for receiving acoustic signals;
   storage means for storing calibration parameters indicative of a complex directional response determined from measured one or more quantities indicative of phases and magnitudes of at least one predetermined acoustic calibration signal received from a plurality of respective directions by each of the receiver elements;
   a signal processor adapted to compensate the received acoustic echo signal for the determined complex directional response for each of the receiver elements.

12. A system for calibrating a sonar apparatus according to claim 11 the system comprising:
   means for generating acoustic calibration signals towards the sonar apparatus from respective positions relative to the sonar apparatus;
   signal processing means for measuring one or more quantities indicative of phases and magnitudes of the acoustic calibration signals received by each of the receiver elements;
   processing means for determining a complex directional response from the measured one or more quantities for each of the receiver elements;
   means for storing calibration parameters indicative of the determined complex directional response for each of the receiver elements in the storage means of the sonar apparatus.

* * * * *